(12) United States Patent
Pleyer (10) Patent No.: US 7,178,472 B2
(45) Date of Patent: Feb. 20, 2007

(54) GEARBOX, PARTICULARLY FOR TRANSMISSION SYSTEMS IN DEVICES FOR METERING GRANULAR MATERIALS, AND A METERING DEVICE INCLUDING THE GEARBOX

(75) Inventor: Peter Pleyer, Bad Essen (DE)

(73) Assignee: Gaspardo Seminatrici S.p.A., Morsano Al Tagliamento (IT)

( * ) Notice: Subject to any disclaimer, the term of this patent is extended or adjusted under 35 U.S.C. 154(b) by 0 days.

(21) Appl. No.: 10/534,192

(22) PCT Filed: Nov. 11, 2002

(86) PCT No.: PCT/IT02/00716

§ 371 (c)(1),
(2), (4) Date: May 6, 2002

(87) PCT Pub. No.: WO2004/044460

PCT Pub. Date: May 27, 2004

(65) Prior Publication Data

US 2006/0052203 A1    Mar. 9, 2006

(51) Int. Cl.
*F16H 29/08*    (2006.01)
*A01C 19/00*    (2006.01)

(52) U.S. Cl. .................. 111/170; 111/200; 111/921

(58) Field of Classification Search ............... 111/170, 111/177–185, 200, 921
See application file for complete search history.

(56) References Cited

FOREIGN PATENT DOCUMENTS

| DE | 844 522 C | 7/1952 |
|---|---|---|
| DE | 855 030 C | 11/1952 |
| DE | 36 15 819 A | 11/1987 |

OTHER PUBLICATIONS

International Search Report for PCT International Application No. PCT/IT2002/000716 mailed Mar. 25, 2003.

*Primary Examiner*—Christopher J. Novosad
(74) *Attorney, Agent, or Firm*—RatnerPrestia (57) ABSTRACT

A gearbox, particularly for transmission systems in devices for metering granular and/or materials in powder form, includes a pair of shafts, that is, a drive-input shaft and a drive-output shaft, respectively. On the output shaft is at least one pair of coaxial freewheels, on each of which an end of a respective linkage carrying a movable fulcrum device is active. The opposite end of each linkage is driven with a reciprocating oscillatory motion about the fulcrum device by way of an eccentric device provided on the drive-input shaft in order to convert the reciprocating oscillatory motion into an intermittent rotary motion of each freewheel and consequently to bring about a rotary motion of the drive-output shaft in a preselected direction of rotation. The drive-input shaft includes at least one pair of cranks with eccentric pins and each linkage includes a respective element substantially similar to a connecting-rod having a first end connected kinematically to the corresponding freewheel and a second, opposite end articulated on the respective pin of the crankshaft with a capability for rotary/translation movement relative to the pin.

21 Claims, 6 Drawing Sheets

GEARBOX, PARTICULARLY FOR TRANSMISSION SYSTEMS IN DEVICES FOR METERING GRANULAR MATERIALS, AND A METERING DEVICE INCLUDING THE GEARBOX

This application is a U.S. National Phase Application of PCT International Application PCT/IT2002/000716.

TECHNICAL FIELD

The present invention relates to a gearbox, particularly for transmission systems in devices for metering granular materials.

The invention also relates to a device for metering granular and/or materials in powder form comprising a gearbox of the above-mentioned type.

TECHNOLOGICAL BACKGROUND

The invention relates, particularly but not exclusively, to the technical field of devices for dispensing and metering granulates such as, for example, those which are used widely in agricultural sowing machines in which there is a need to deliver the material and to control the flow-rate delivered over time and, in particular, a need to vary the flow-rate delivered within a predetermined range of values.

In this field, there are known metering devices which have a transmission shaft on which flow-restricting members are provided and which can be connected for rotation with a drive shaft with the interposition of a gearbox by means of which the output speed, and consequently the flow-rate delivered by the dispenser, is regulated. A typical and preferred application provides for the rate of rotation of the output shaft to be regulated by means of a gearbox with freewheels. In these gearboxes, two freewheels are generally provided on the output shaft; the freewheels are characterized by a profile of the contact bodies which are mounted inside them such as to ensure torque transmission or freewheeling according to the relative directions of rotation of the inner ring and of the outer ring which make up the freewheel.

Each of the freewheels is acted on by the end of a linkage with a movable fulcrum; the opposite end of the linkage is driven with a reciprocating motion by contact with a respective cam keyed to the input shaft of the gearbox. The eccentricity of the cams and their relative offset are such as to convert the reciprocating motion of the linkages into an intermittent rotary motion of the freewheels so as to rotate the output shaft with a preselected direction of rotation and at a predetermined speed. Adjustment of the position of the movable fulcrum, which is disposed in a position between opposite ends of the linkage, determines the preselected transmission ratio between the input shaft and the output shaft of the gearbox. A gearbox having the features outlined above is known from DE 844522. Moreover, a spring with a resilient biasing function is provided to return each freewheel to the initial position after each half turn of the input shaft (the cams are typically offset by 180°). An example of a gearbox devised for applications in metering devices of sowing machines is known from DE 3615819.

BRIEF SUMMARY OF THE INVENTION

A main object of the present invention is to provide a gearbox for applications of the above-mentioned type in which the rotary motion of the gearbox output shaft, which is subjected to the intermittent and reciprocating motion of each of the freewheels keyed thereto, is rendered more uniform.

Another object is to render the operation of the transmission members of the gearbox independent of any resilient biasing means of the type provided in known solutions, so that the stresses acting on these members are substantially uniform at the respective rates of rotation, and are independent of the position in which the gearbox is mounted.

These objects and yet others which will be pointed out below are achieved by the invention by means of a gearbox formed in accordance with the appended claims.

BRIEF DESCRIPTION OF THE DRAWINGS

The characteristics and the advantages of the invention will become clearer from the following detailed description of a preferred embodiment thereof which is described by way of non-limiting example with reference to the appended drawings, in which.

PREFERRED EMBODIMENT OF THE INVENTION

With reference to the drawings mentioned, a gearbox formed in accordance with the present invention and devised for controlling transmission in a metering device 2 for granular materials, for example, of the type usable in a sowing machine, is generally indicated 1.

The metering device 2 comprises a control shaft on which metering members (for example, metering wheels) and flow-restricting elements are mounted in conventional configurations for the metered output of the granulate.

The control shaft can be coupled for rotation with a drive shaft with the interposition of the gearbox 1 in order to regulate the flow-rate of granulate delivered, depending on the speed produced in adjustable manner at the output of the gearbox.

A housing, indicated 3, of the gearbox 1 is suitable for housing the transmission members and includes two half-shells 3a, 3b, clamped against one another by means of respective flanges 4.

The gearbox 1 also comprises a pair of shafts 5, 6 for the input of the drive to the gearbox and for its output therefrom, respectively, each shaft being supported rotatably in the housing 3 by means of respective pairs of bearings, all indicated 7.

A pair of coaxial freewheels 8 is mounted on the output shaft 6.

Figure 1:
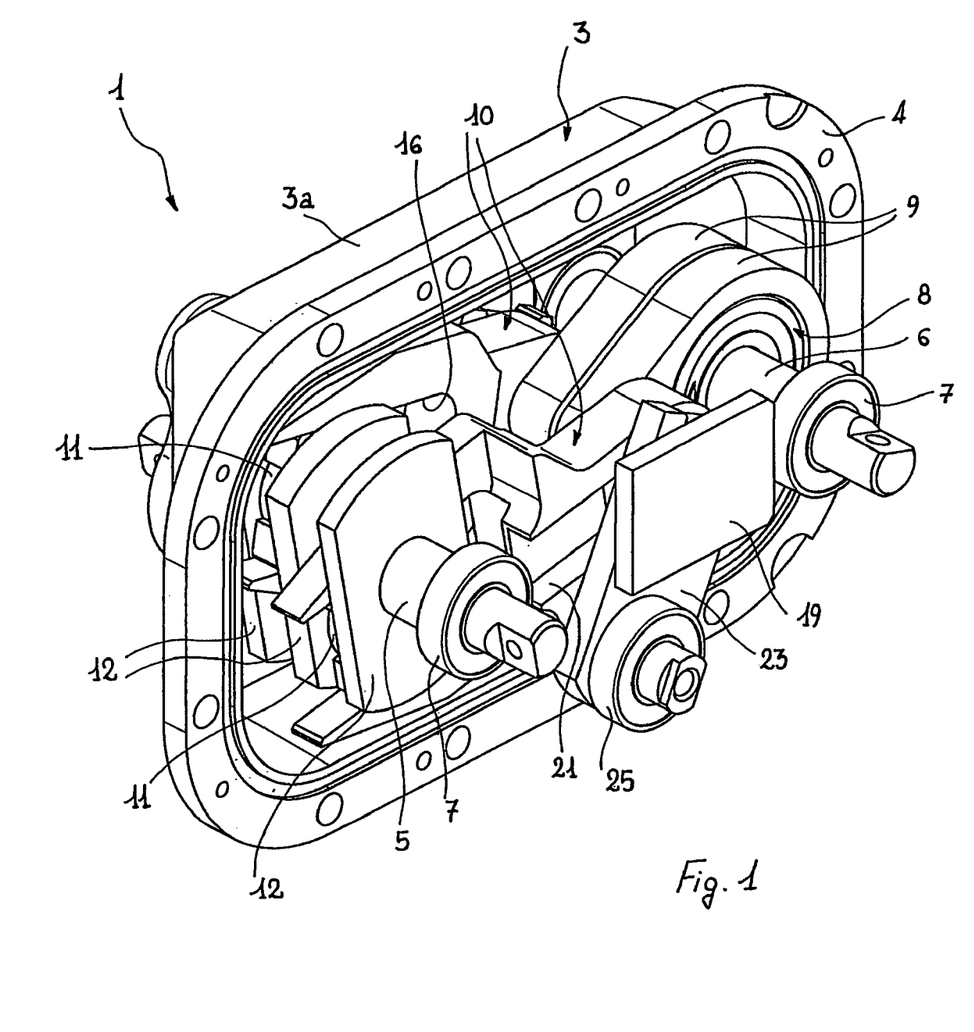
FIG. 1 is a partially cut-away, perspective view of a gearbox according to the present invention.
Figure 2:
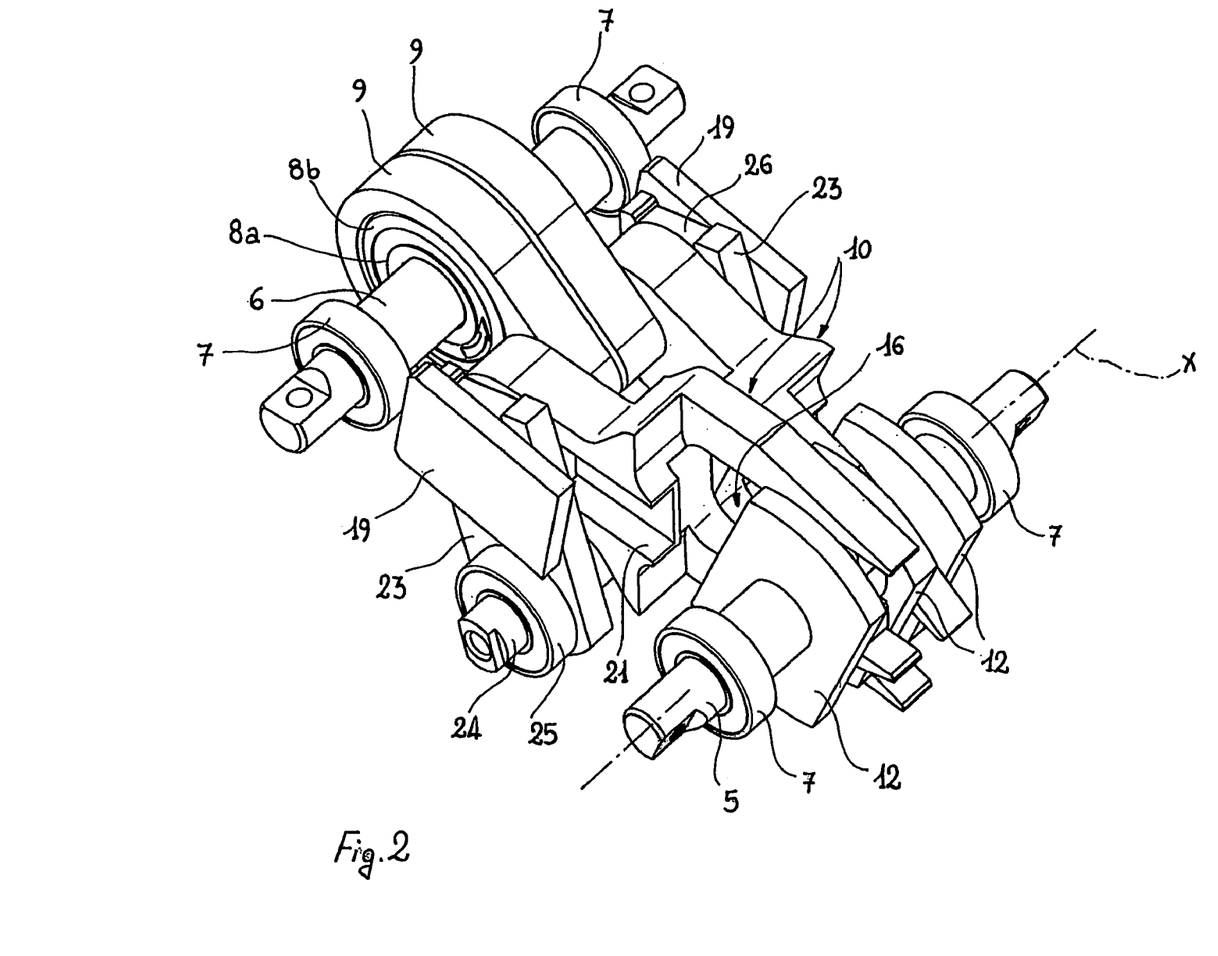
FIG. 2 is a further perspective view of the gearbox of FIG. 1, FIGS. 3 and 4 are exploded, perspective views of the transmission members of the gearbox of the preceding drawings.
Figure 3:
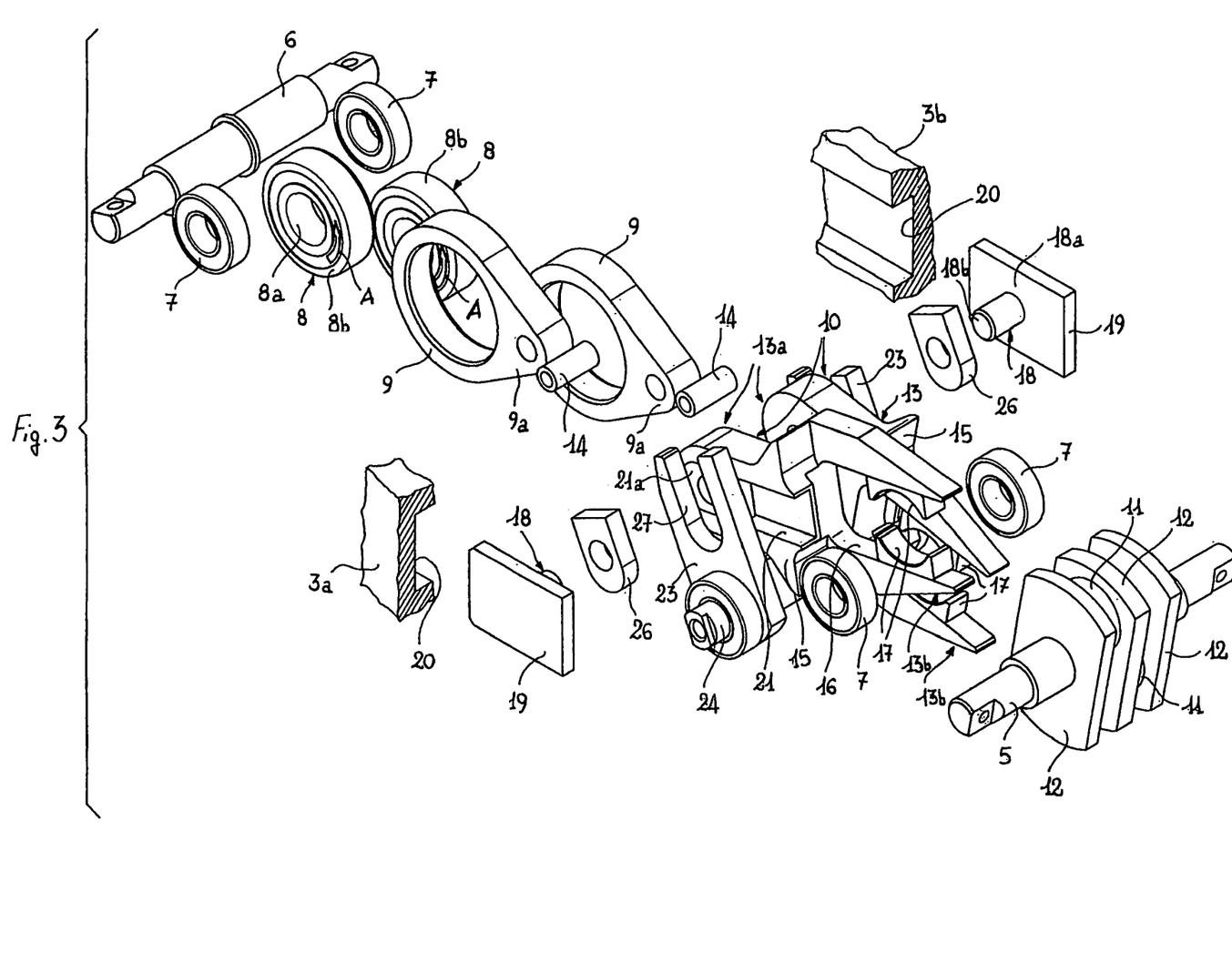
Figure 4:
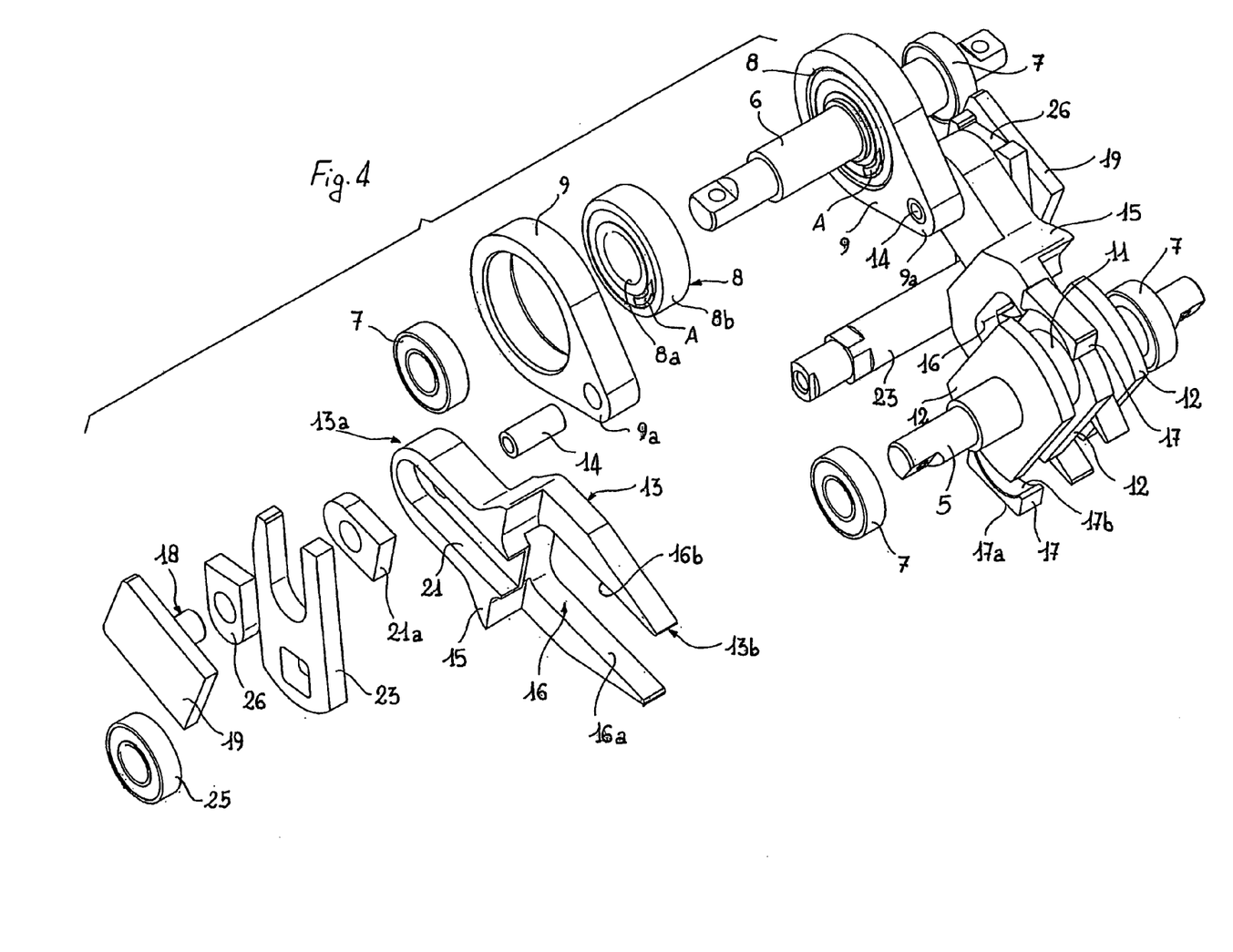

Each freewheel 8 comprises an inner ring 8a keyed to the shaft 6 and an outer ring 8b. Contact bodies (not shown) are interposed between the rings 8a, 8b and have configurations and profiles such as to ensure torque transmission (in the direction of the arrows A of FIG. 3) or freewheeling of the wheel (in the opposite direction to the arrows A), according to the direction of relative rotation of the rings 8a, 8b. Moreover, a respective collar 9, keyed to each outer ring 8b, is fixed for rotation with the ring 8b and carries a portion 9a provided for kinematic connection to a respective linkage, generally indicated 10, which in turn is operatively connected to the drive-input shaft 5 as described in detail below.

The shaft 5 for the input of drive to the gearbox has an axis of rotation X and is formed with a pair of cranks with eccentric pins 11 extending between radial arms 12. The eccentric pins 11 are advantageously offset relative to one another by 180° with respect to the axis of rotation X.

Each linkage 10 comprises an element 13 substantially similar to a connecting rod and having a first end 13a articulated to the corresponding portion 9a of the freewheel 8 by means of a pin 14 and an opposite end 13b articulated on the corresponding eccentric pin 11 of the crankshaft 5 with a capability for rotary/translational movement relative to the pin 11.

Only one of the two connecting-rod elements 13 will be described in detail below since they are structurally identical.

The connecting-rod element 13 has a stem 15 which extends longitudinally between opposite ends 13a, 13b and in which a slot-like portion 16, defined by opposed, parallel and spaced-apart walls 16a, 16b, is provided. The slot 16 is elongate in a transverse direction relative to the axis of rotation X of the shaft 5 and is open at the end 13b of the connecting rod. The corresponding eccentric pin 11 is engaged slidably and rotatably between the opposed walls 16a, 16b of the slot 16 so as to guide the connecting rod during the eccentric rotation of the pin relative to the axis X. Preferably, a respective sliding block 17 is interposed between each wall 16a, 16b of the slot 16 and the pin 11, the sliding block 17 having a first surface 17a and a second surface 17b which are in sliding contact with the wall of the slot and with the pin, respectively.

A movable fulcrum means is also provided on the stem 15 of each connecting-rod element 13, in a position between the ends 13a, 13b of the connecting rod, and can convert the eccentric motion of the crankshaft into a reciprocating oscillatory motion of the connecting rod about the fulcrum and consequently give rise to an intermittent rotary motion of the corresponding freewheel as well as a rotary motion of the gearbox output shaft in the same direction, as will become clear from the following description. The movable fulcrum means comprises, for each connecting-rod element 13, a respective fulcrum pin 18 having a first axial end 18a which is guided on an inner surface of the respective half-shell 3a, 3b of the gearbox housing. Preferably, the end 18a comprises a plate-shaped head 19 guided slidably in a seat 20 of the gearbox housing, which is shown only partially. The fulcrum pin 18 comprises a second, opposite axial end 18b which is restrained on the corresponding connecting-rod element 13 to constitute the centre of the rotation of the connecting rod about the fulcrum.

The second end 18b of the fulcrum pin 18 is guided movably along the stem 15 of the connecting rod by the slidable and rotatable engagement of the pin 18 in a seat 21 formed in the stem, from the end 13a towards the opposite end 13b of the connecting rod. The fulcrum pin 18 is advantageously guided in the seat 21 with the interposition of a sliding block 21a which is engaged slidably in the seat and connected rotatably to the pin. The movement of the fulcrum 18 relative to the stem defines different lever arms, that is, distances between the fulcrum and the respective points of articulation of each connecting rod on the crankshaft and on the freewheel, so as consequently to adjust the transmission ratio between the drive-input and drive-output shafts 5, 6 of the gearbox.

Actuator means for the operative control of the movement of the fulcrum means along the connecting-rod stem in an adjustable manner correlated with the preselected transmission ratio between the shafts 5, 6 are generally indicated 22. The actuator means 22 comprise, for each fulcrum pin 18, a respective lever mechanism 23 having a free end 23a fixed for rotation with a control shaft 24 which is supported rotatably in the gearbox housing by means of bearings 25. The pin 18 is also articulated to the lever mechanism 23 with a capability for rotary/translational movement between the pin and the lever mechanism. Preferably, each pin 18 is articulated to the respective lever mechanism in an intermediate portion between its ends 18a, 18b, with the interposition of a sliding block 26 engaged slidably in a seat 27 of the lever mechanism and connected rotatably to the fulcrum pin 18. It should be noted that both of the lever mechanisms 23 are connected to the control shaft 24 at the opposite axial ends thereof.

The gearbox operates as follows.

Figure 5:
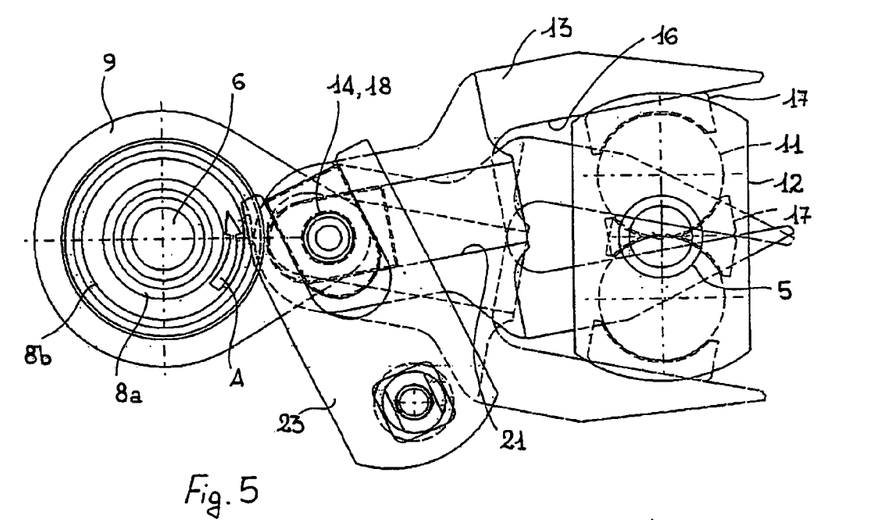
FIGS. 5 and 6 are schematic views of the gearbox of the preceding drawings in two distinct kinematic configurations of operation.

With reference to a first kinematic configuration shown schematically in FIG. 5, the fulcrum pins 18 are moved relative to the respective stems of the connecting-rod elements 13 to a position such as to be coaxial with the corresponding pins 14 articulating the connecting rods 13 to the corresponding freewheels 8. In this configuration, each connecting-rod element 13 is thus driven with a reciprocating oscillatory motion about the pins 18, 14 (which are coaxial), thus defining the centre of rotation of each connecting rod.

In FIG. 5, one of the connecting rods 13 is shown in the opposite maximum pivoting positions (in continuous outline and in broken outline, respectively) which are reached as a result of the eccentric motion of the respective pin 11. It should be understood that the other connecting-rod element 13 (not shown) is driven with an oscillatory motion of the same amplitude but offset by 180°.

It should be noted that no rotary motion of the freewheels 8 is brought about in this kinematic configuration by virtue of the coaxial arrangement of the pins 18, 14 and, consequently, no rotational velocity is imparted to the output shaft 6.

Figure 6:
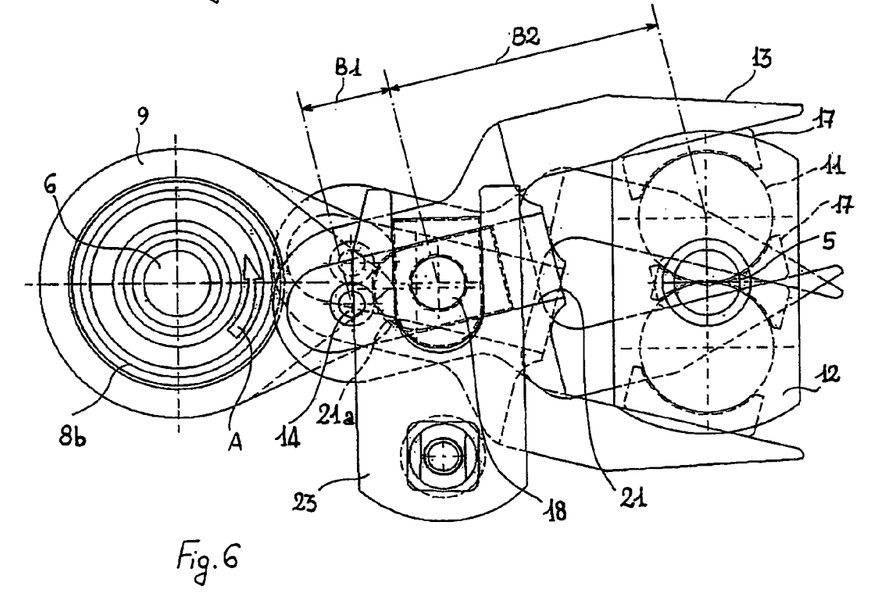
Figure 7:
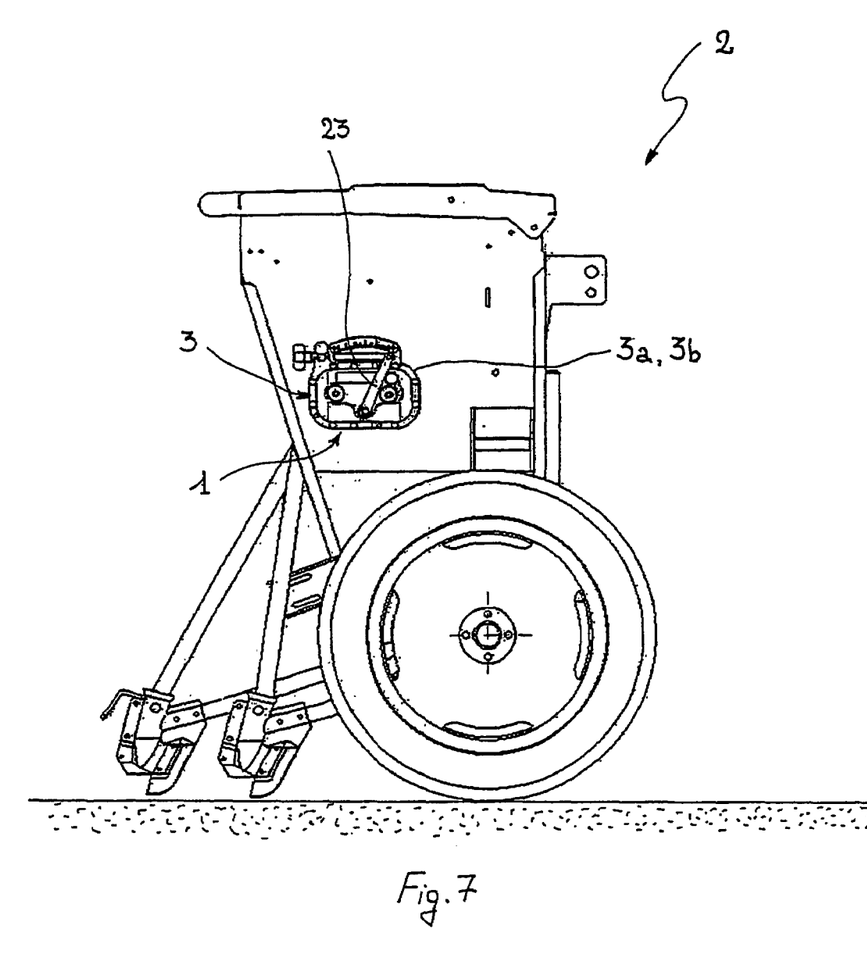
FIG. 7 is a side elevational view of a metering device equipped with the is gearbox of the invention according to the preceding drawings.

Starting from the kinematic configuration of FIG. 5, as a result of a preselected movement of the fulcrum pins 18 (by the rotational operation of the lever mechanisms 23 about the axis of rotation of the control shaft 24), along the stems of the connecting-rod elements 13, respective lever arms, indicated B1 and B2, that is, distances between the fulcrum point 18 and the points of articulation of the connecting rod to the freewheel (pin 14) and to the shaft 5 (pin 11), are defined in the stems. FIG. 6 shows a kinematic configuration with preselected lever arms B1 and B2. In this case, the oscillatory motion of each connecting rod 13 about the pin 18 (centre of rotation) brings about a reciprocating rotary motion of the outer ring 8b of each freewheel 8, by means of the arm B1. During the stage in which the ring 8b rotates in the direction of the arrow A, the drive-output shaft 6 is rotated by the freewheel whereas, in the opposite direction, no rotation of the shaft 6 is brought about owing to the free rotational coupling between the rings 8a, 8b. It should be noted that, by virtue of the offset in the oscillatory motion of the connecting rods (produced by the eccentric pins 11 which are offset by 180°), for each half turn of the drive-input shaft 5, one or other of the freewheels 8 is active in imparting a rotary motion to the shaft 6, the freewheels 8 thus being active alternately. The peripheral velocity of each freewheel (and hence the transmission ratio between the shafts 5 and 6) depends on the ratio between the lever arms B1, B2.

The transmission ratio between the input and output shafts of the gearbox is therefore adjusted by adjusting the displacement of the fulcrum pins 18 along the connecting-rod stem. It should be noted that, during the stage in which each freewheel rotates freely (in the opposite direction to the arrow A), the respective collar portion 9 (together with the outer ring 8b) is returned to the opposite, initial oscillation position by the connecting rod itself, which is driven with the eccentric rotary motion of the pin 11, and no resilient biasing means are therefore required on the connecting-rod elements 13. Moreover, the relative sliding between the connecting-rod element 13 and the eccentric pin 11, which is permitted by the slot 16, compensates for the change in the length of the arm B2 as a result of the adjustment of the fulcrum point 18. In this case, the connecting-rod element may advantageously be formed in one piece (without requiring relative sliding portions) since the length compensation is entrusted to the slidable engagement of the articulation pin 11 in the slot 16.

The provision of slots 16 which are open at the free end of each connecting-rod element 13 also advantageously simplifies operations to assemble/disassemble the transmission members of the gearbox.

According to the invention, an almost continuous variation of the speed between the shafts 5 and 6 can be achieved with a maximum transmission ratio preferably of between "infinity":1 and 4:1.

Moreover, rates of rotation of several hundred revolutions per minute up to 1000 revolutions per minute or more, can advantageously be applied to the drive-input shaft 5 in particular by virtue of the kinematic coupling, according to the invention, between each connecting-rod element 13 and the respective eccentric pin 11 of the drive-input crankshaft.

The kinematic coupling between each connecting rod 13 and the corresponding freewheel 8 also means that it is not necessary to use means for returning the connecting rod during the stage in which the freewheel is rotating freely. The absence of resilient biasing means advantageously enables a so-called "desmodromic" kinematic chain to be formed in the gearbox according to the invention, which can also render the stresses acting on the transmission members independent of the position in which the gearbox is mounted, improving the versatility of the gearbox in the preselected applications.

The gearbox according to the invention thus advantageously permits a more uniform and regular operation of the drive-output shaft which is subjected to the intermittent motion of the freewheels acting thereon.

The invention thus achieves the objects proposed, affording the advantages indicated over known solutions.

The invention claimed is:

1. A gearbox for transmission systems in devices for metering materials, comprising: a pair of shafts, including a drive-input shaft and a drive-output shaft, respectively, provided on the drive-output shaft at least one pair of coaxial freewheels, on each of which an end of a respective linkage carrying a movable fulcrum means is active, the opposite end of each linkage being driven with a reciprocating oscillatory motion about the fulcrum means by an eccentric device provided on the drive-input shaft in order to convert the reciprocating oscillatory motion into an intermittent rotary motion of each freewheel and to bring about a rotary motion of the drive-output shaft in a preselected direction of rotation, the drive-input shaft including at least one pair of cranks with eccentric pins, and each linkage including a respective connecting-rod element having a first end connected kinematically to the corresponding freewheel and a second, opposite end articulated on the respective pin of the drive-input shaft with a capability for rotary and translational movement relative to the pin, the movable fulcrum means including, for each connecting-rod element, a respective fulcrum pin, each fulcrum pin being movable, in adjustable manner, between the first end and second end of the connecting-rod element so as to define different lever arms between said ends and to adjust a transmission ratio between the drive-input shaft and the drive output-shaft of the gearbox, and each fulcrum pin has a first end restrained on a stationary structure of the gearbox and an opposite second end restrained on the corresponding connecting-rod element to constitute the center of the rotation of said connecting-rod element during the reciprocating oscillatory motion relative to the drive-input shaft, said first end of the fulcrum pin being guided slidably in a wall of a casing constituting a gearbox housing and the second end of said fulcrum pin being engaged rotatably and slidably in a seat formed in the corresponding connecting-rod element.

2. The gearbox according to claim 1 in which guide means are provided on each of the connecting-rod elements for guiding the second connecting-rod end on the respective pin of the crankshaft during the eccentric rotary motion of the pins relative to rotation of the drive-input shaft.

3. The gearbox according to claim 2 in which the guide means comprise, on each connecting-rod element, a respective elongate slot portion which can be engaged slidably by the corresponding pin.

4. The gearbox according to claim 3 in which the slot portion is elongate in a direction transverse the rotation of the drive-input shaft of the gearbox.

5. The gearbox according to claim 3 in which the slot-like portion is open at the second end of the connecting-rod element.

6. The gearbox according to claim 5 in which the open slot-like portion is defined by a pair of opposed, parallel and spaced-apart walls between which the corresponding pin of the drive-input crankshaft is guided slidably.

7. The gearbox according to claim 6 in which at least one sliding block is interposed between the walls of the slot and the pin, the sliding block having a first surface and a second surface which are in sliding contact with the walls of the slot and with the pin, respectively.

8. The gearbox according to claim 1 in which the eccentric pins provided in the cranks of the drive-input shaft are offset by 180° relative to the rotation of the shaft.

9. The gearbox according to claim 1 in which each of the freewheels comprises an inner ring keyed to the drive-output shaft and an outer ring coaxial therewith and capable of rotating freely or with torque transmission, depending on the direction of relative rotation of the rings, each connecting-rod element being articulated, at the first end, to a collar portion fitted on the outer ring and fixed for rotation therewith.

10. The gearbox according to claim 1 in which the second end of the fulcrum pin is guided in the seat with the interposition of a sliding block engaged slidably in the seat and coupled rotatably with the pin.

11. The gearbox according to claim 1 in which the seat extends from the first end of the connecting-rod towards the second, opposite end of the connecting-rod.

12. The gearbox according to claim 1 in which actuator means are provided and are active on the fulcrum pins in order to move the position of the fulcrum relative to the connecting rod in an adjustable manner correlated with a preselected transmission ratio between the drive-input shaft and the drive-output shaft of the gearbox.

13. The gearbox according to claim 12 in which the actuator means comprise, for each fulcrum pin, a lever mechanism a free end of which is fixed for rotation with a control shaft and which is articulated on the fulcrum pin with a capability for rotary movement between the fulcrum pin and the lever mechanism.

14. The gearbox according to claim 13 in which each fulcrum pin is restrained on the respective lever mechanism with the interposition of a sliding block engaged slidably in a seat of the lever mechanism and coupled rotatably with the fulcrum pin.

15. The gearbox according to claim 12 in which the actuator means comprise, for each fulcrum pin, a lever mechanism a free end of which is fixed for rotation with a control shaft and which is articulated on the fulcrum pin with a capability for translational movement between the fulcrum pin and the lever mechanism.

16. A metering device for the metered delivery of materials, comprising a gearbox formed in accordance with claim 1 for controlling transmission to respective metering members.

17. A agricultural sowing machine comprising a metering device for the metered delivery of granular seed, formed in accordance with claim 16.

18. The metering device according to claim 16, wherein the metering device is for the metered delivery of granular and materials in powder form.

19. The metering device according to claim 16, wherein the metering device is for the metered delivery of granular or materials in powder form.

20. The gearbox according to claim 1, wherein the gearbox is for transmission systems in devices for metering granular and materials in powder form.

21. The gearbox according to claim 1, wherein the gearbox is for transmission systems in devices for metering granular or materials in powder form.

* * * * *

UNITED STATES PATENT AND TRADEMARK OFFICE
CERTIFICATE OF CORRECTION

PATENT NO.      : 7,178,472 B2                                   Page 1 of 1
APPLICATION NO. : 10/534192
DATED           : February 20, 2007
INVENTOR(S)     : Peter Pleyer It is certified that error appears in the above-identified patent and that said Letters Patent is hereby corrected as shown below:

On the Title page item (86) please delete "May 6, 2002" and substitute therefore, --May 6, 2005--

Signed and Sealed this

Eighth Day of May, 2007

JON W. DUDAS
*Director of the United States Patent and Trademark Office*